US012518072B2

(12) United States Patent
Liu et al.

(10) Patent No.: US 12,518,072 B2
(45) Date of Patent: Jan. 6, 2026

(54) SIMULATION TEST SYSTEM AND SIMULATION TEST METHOD

(71) Applicants: Chien-Lee Liu, Taipei (TW); Wen-Hua Kao, Taipei (TW); Tzu-Chiang Mi, Taipei (TW); Wei-Chih Shih, Taipei (TW); Hsun-Hung Wang, Taipei (TW); Hao-Jung Chiou, Taipei (TW); Yi-Hsun Lin, Taipei (TW)

(72) Inventors: Chien-Lee Liu, Taipei (TW); Wen-Hua Kao, Taipei (TW); Tzu-Chiang Mi, Taipei (TW); Wei-Chih Shih, Taipei (TW); Hsun-Hung Wang, Taipei (TW); Hao-Jung Chiou, Taipei (TW); Yi-Hsun Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 815 days.

(21) Appl. No.: 17/887,527

(22) Filed: Aug. 15, 2022

(65) Prior Publication Data
US 2023/0056613 A1 Feb. 23, 2023

Related U.S. Application Data

(60) Provisional application No. 63/234,691, filed on Aug. 18, 2021.

(51) Int. Cl.
*G06F 30/20* (2020.01)
*H02J 7/00* (2006.01)
*G06F 119/06* (2020.01)

(52) U.S. Cl.
CPC .......... *G06F 30/20* (2020.01); *H02J 7/0047* (2013.01); *H02J 7/00712* (2020.01); *G06F 2119/06* (2020.01)

(58) Field of Classification Search
CPC .... G06F 30/20; G06F 2119/06; H02J 7/0047; H02J 7/00712
See application file for complete search history.

(56) References Cited

U.S. PATENT DOCUMENTS 6,304,839 B1 10/2001 Ho et al.

FOREIGN PATENT DOCUMENTS

| CN | 102680899 | | 9/2012 | |
| CN | 106772068 A | * | 5/2017 | ............. G01R 31/36 |

(Continued)

OTHER PUBLICATIONS

Bazargan, Damon. "Hardware-in-Loop Simulation of Battery storage systems for power system applications." (2012). (Year: 2012).*

(Continued)

*Primary Examiner* — Chuen-Meei Gan
(74) *Attorney, Agent, or Firm* — JCIPRNET (57) ABSTRACT

A simulation test system and a simulation test method are provided. The simulation test system includes a control device, a power setting device, and a data capture device. The control device generates a context control signal corresponding to one of a plurality of operating contexts. The power setting device generates at least one of a simulated charging power and a simulated load in response to the context control signal and provides at least one of the simulated charging power and the simulated load to a device under test to configure the device under test to generate test data in response to at least one of the simulated charging power and the simulated load. The data capture device captures the test data and provides the test data to the control device.

13 Claims, 7 Drawing Sheets

(56) References Cited

FOREIGN PATENT DOCUMENTS

| CN | 109471373 | 3/2019 |
|---|---|---|
| CN | 106226723 | 2/2020 |
| TW | I267755 | 12/2006 |
| TW | I670617 | 9/2019 |

OTHER PUBLICATIONS

Niedermeyer F, Braun M. Comparison of performance-assessment methods for residential PV battery systems. Energies. Oct. 22, 2020;13(21):5529. (Year: 2020).*

"Office Action of China Counterpart Application", issued on Aug. 2, 2025, p. 1-p. 10.

* cited by examiner

SIMULATION TEST SYSTEM AND SIMULATION TEST METHOD

CROSS-REFERENCE TO RELATED APPLICATION

This application claims the priority benefit of U.S. provisional application Ser. No. 63/234,691, filed on Aug. 18, 2021. The entirety of the above-mentioned patent application is hereby incorporated by reference herein and made a part of this specification.

BACKGROUND

Technical Field

The disclosure relates to a test system and a test method. In particular, the disclosure relates to a simulation test system and a simulation test method for performing a variety of power context tests on a device under test.

Description of Related Art

A plurality of testing procedures may be performed on a device before leaving the factory or during development. Generally, test procedures may be performed on reliability of a device. However, current testing procedures do not include simulation testing on a device based on a special or customized operating context. In other words, current testing procedures do not support testing in a special or customized operating context.

SUMMARY

The disclosure provides a simulation test system and a simulation test method, in which a variety of power context tests may be performed on a device under test.

According to an embodiment of the disclosure, a simulation test system for testing a device under test includes a control device, a power setting device, and a data capture device. The control device is configured to generate a context control signal corresponding to one of a plurality of operating contexts. The power setting device is coupled to the control device and the device under test, and is configured to generate at least one of a simulated charging power and a simulated load in response to the context control signal and provide at least one of the simulated charging power and the simulated load to the device under test to configure the device under test to generate test data in response to at least one of the simulated charging power and the simulated load. The data capture device is coupled to the control device and the device under test, and is configured to capture the test data and provide the test data to the control device.

According to an embodiment of the disclosure, a simulation test method is for testing a device under test includes the following. A context control signal corresponding to one of a plurality of operating contexts is generated. At least one of a simulated charging power and a simulated load is generated in response to the context control signal and at least one of the simulated charging power and the simulated load is provided to the device under test. The device under test is configured to simulate a test behavior of the device under test in a corresponding operating context to generate test data in response to at least one of the simulated charging power and the simulated load.

Based on the foregoing, in the simulation test system and the simulation test method according to the embodiments of the disclosure, at least one of the simulated charging power and the simulated load is generated in response to the context control signal, and at least one of the simulated charging power and the simulated load is provided to the device under test. The device under test simulates the test behavior of the device under test in the corresponding operating context in response to at least one of the simulated charging power and the simulated load. Accordingly, the device under test may perform simulation tests of a variety of power contexts.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Some embodiments of the disclosure accompanied with the drawings will now be described in detail. For reference numerals in the following description, the same reference numerals shown in different drawings will be regarded as the same or similar elements. These embodiments are only a part of the disclosure and do not disclose all possible implementations of the disclosure. Rather, these embodiments are only examples within the claim scope of the disclosure.

Figure 1:
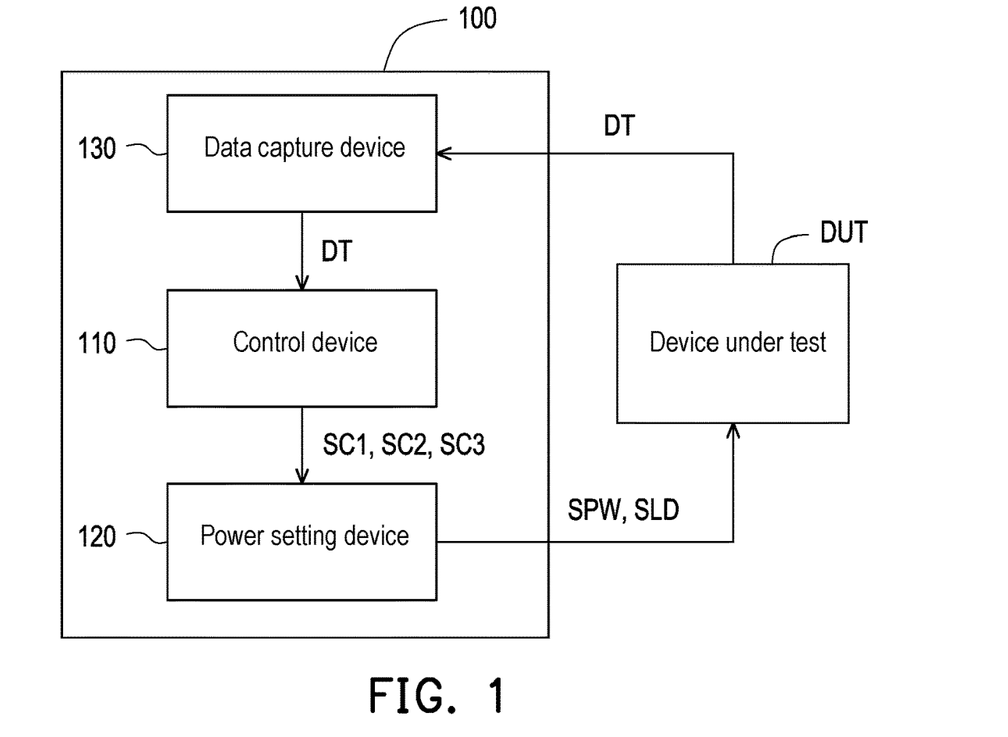
FIG. 1 is a schematic diagram of a simulation test system according to a first embodiment of the disclosure.

With reference to FIG. 1, FIG. 1 is a schematic diagram of a simulation test system according to a first embodiment of the disclosure. In this embodiment, a simulation test system 100 for testing a device under test DUT includes a control device 110, a power setting device 120, and a data capture device 130. The control device 110 generates a context control signal corresponding to one of a plurality of operating contexts. For example, the control device 110 generates a context control signal SC1 in a first operating context, the control device 110 generates a context control signal SC2 in a second operating context, and the control device 110 generates a context control signal SC3 in a third operating context. The power setting device 120 is coupled to the control device 110 and the device under test DUT. The power setting device 120 generates at least one of a simulated charging power SPW and a simulated load SLD in response to the received context control signal (e.g., one of the context control signals SC1 to SC3) and provides at least one of the simulated charging power SPW and the simulated load SLD to the device under test DUT. Therefore, the device under test DUT generates test data DT in response to at least one of the simulated charging power SPW and the simulated load SLD. Further, at least one of the simulated charging power SPW and the simulated load SLD may serve to simulate a test behavior of the device under test DUT in a corresponding operating context to generate the test data DT.

In this embodiment, the data capture device 130 is coupled to the control device 110 and the device under test DUT. The data capture device 130 captures the test data DT from the device under test DUT and provides the test data DT to the control device 110. Therefore, the control device 110 may obtain a simulation result of the test behavior of the device under test DUT in a corresponding operating context based on the test data DT.

It is worth mentioning here that, the power setting device 120 generates at least one of the simulated charging power SPW and the simulated load SLD in response to the context control signal and provides at least one of the simulated charging power SPW and the simulated load SLD to the device under test DUT. The device under test DUT simulates the test behavior of the device under test DUT in a corresponding operating context in response to at least one of the simulated charging power SPW and the simulated load SLD. Accordingly, the device under test DUT may perform simulation tests of a variety of power contexts.

In this embodiment, the device under test DUT may be an electronic device, an integrated circuit, or a circuit board.

In this embodiment, the control device 110 may be a control host, for example, a personal computer, a notebook computer, a tablet computer, or a server among other electronic devices.

In this embodiment, the data capture device 130 may be a control circuit for receiving the test data DT. The data capture device 130 is implemented by an Arduino unit, for example. The control device 110 may configure the data capture device 130 to capture the test data DT based on a capture period. In some embodiments, the data capture device 130 may be disposed inside the control device 110.

For the convenience of description, three operating contexts and three context control signals SC1 to SC3 are taken as examples in this embodiment. Nonetheless, the disclosure is not limited thereto. The number of operating contexts and the number of context control signals in the disclosure may each be one or above.

Figure 2:
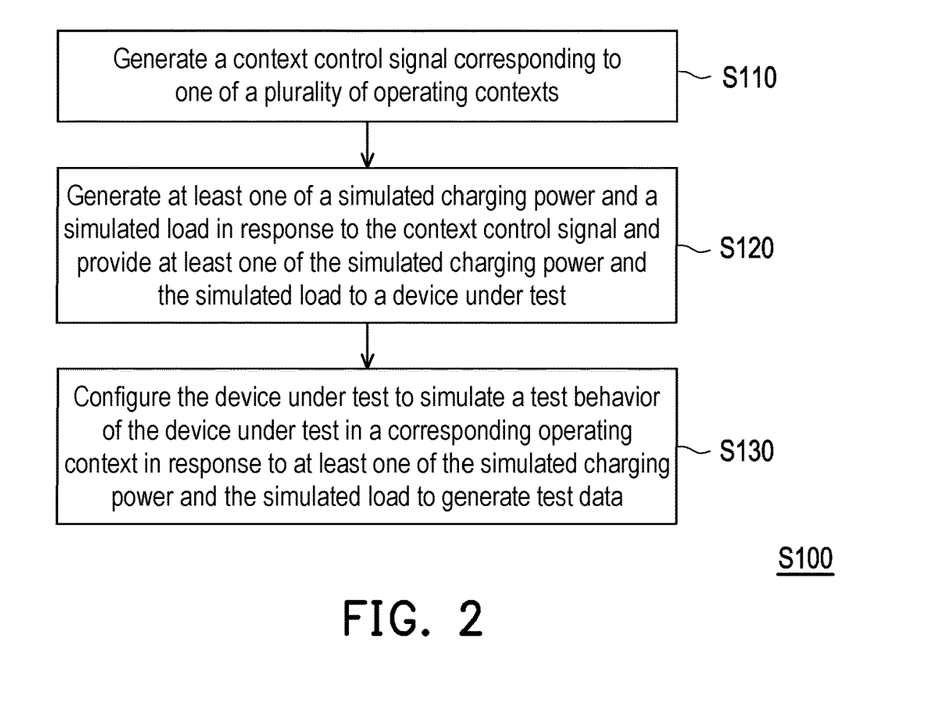
FIG. 2 is a first flowchart of a simulation test method according to an embodiment of the disclosure.

With reference to FIG. 1 and FIG. 2 together, FIG. 2 is a first flowchart of a simulation test method according to an embodiment of the disclosure. A simulation test method S100 is for testing the device under test DUT. The simulation test method S100 is applicable to the simulation test system 100. The simulation test method S100 includes steps S110 to S130. In step S110, the control device 110 generates a context control signal corresponding to one of a plurality of operating contexts. In step S120, the power setting device 120 generates at least one of the simulated charging power SPW and the simulated load SLD in response to the context control signal and provides at least one of the simulated charging power SPW and the simulated load SLD to the device under test DUT. In step S130, the device under test DUT simulates a test behavior of the device under test DUT in a corresponding operating context in response to at least one of the simulated charging power SPW and the simulated load SLD to generate the test data DT. The implementation details of steps S110 to S130 have been clearly described in the embodiment of FIG. 1, and will therefore not be repeatedly described here.

Figure 3:
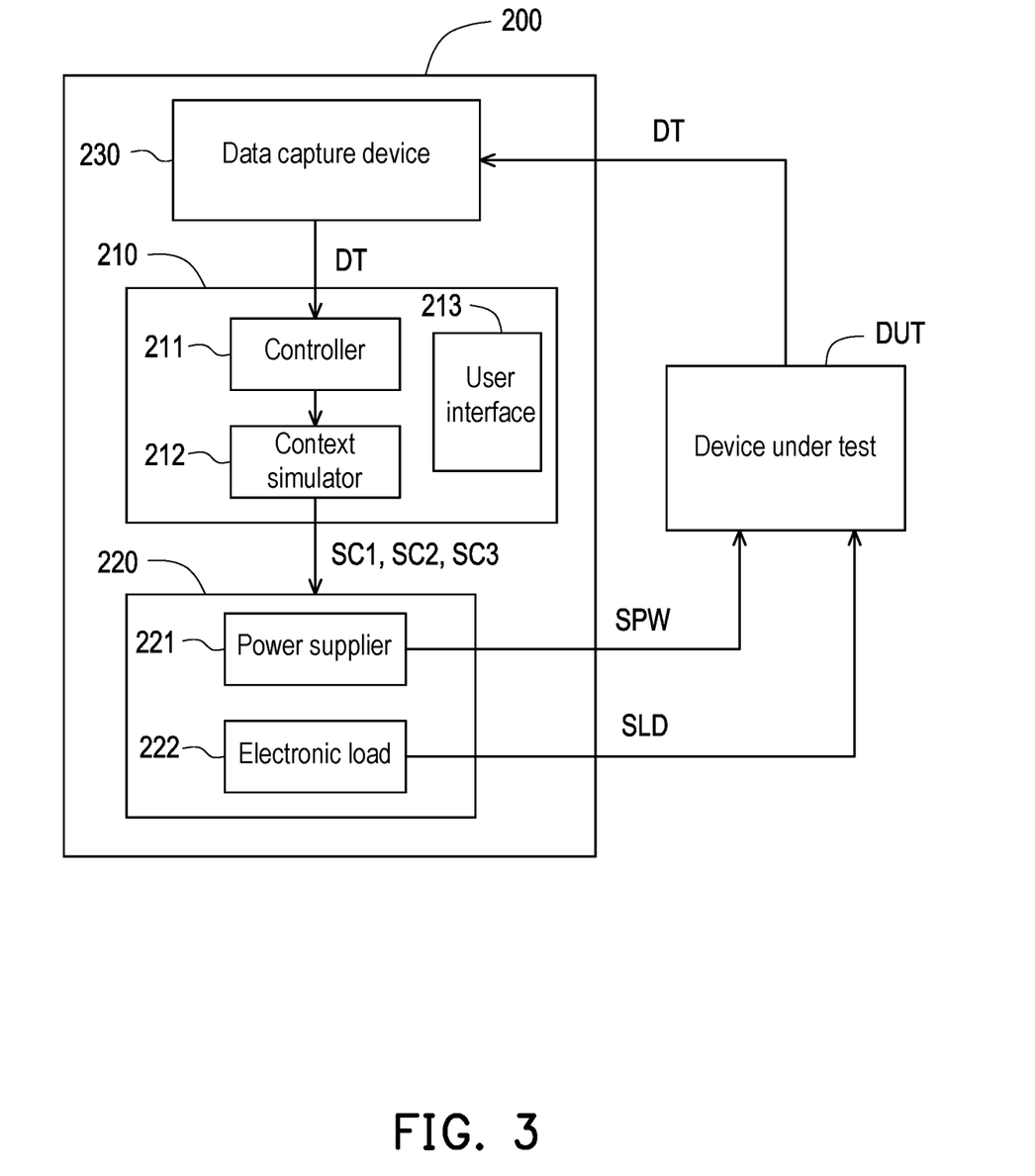
FIG. 3 is a schematic diagram of a simulation test system according to a second embodiment of the disclosure.

With reference to FIG. 3, FIG. 3 is a schematic diagram of a simulation test system according to a second embodiment of the disclosure. In this embodiment, a simulation test system 200 includes a control device 210, a power setting device 220, and a data capture device 230. The control device 210 includes a controller 211, a context simulator 212, and a user interface 213. The controller 211 is coupled to the data capture device 230 and the context simulator 212. The context simulator 212 is coupled to the power setting device 220. The controller 211 receives the test data DT. The controller 211 controls the context simulator 212 to generate one of the context control signals SC1 to SC3 to configure the power setting device 220 to simulate the test behavior of the device under test DUT in a corresponding operating context. The test data DT may be associated with a simulation result of the test behavior. The user interface 213 provides corresponding operation interfaces in different operating contexts.

In this embodiment, the power setting device 220 includes a power supplier 221 and an electronic load (E-load) 222. The power supplier 221 is coupled to the control device 210 and the device under test DUT. The power supplier 221 generates the simulated charging power SPW in response to the context control signal. The electronic load 222 is coupled to the control device 210 and the device under test DUT. The electronic load 222 generates the simulated load SLD in response to the context control signal.

For example, the controller 211 controls the context simulator 212 to generate the context control signal SC1 in a first operating context. The power supplier 221 receives the context control signal SC1. The power supplier 221 generates the simulated charging power SPW in response to the context control signal SC1. In addition, the electronic load 222 receives the context control signal SC1. The electronic load 222 is disabled in response to the context control signal SC1. Therefore, the device under test DUT may perform a test based on the simulated charging power SPW and provide the test data DT of the first operating context in the first operating context.

For another example, the controller 211 controls the context simulator 212 to generate the context control signal SC2 in a second operating context. The power supplier 221 receives the context control signal SC2. The power supplier 221 is disabled in response to the context control signal SC2. In addition, the electronic load 222 receives the context control signal SC2. The electronic load 222 generates the simulated load SLD in response to the context control signal SC2. Therefore, the device under test DUT may perform a test based on the simulated load SLD and provide the test data DT of the second operating context in the second operating context.

For still another example, the controller 211 controls the context simulator 212 to generate the context control signal SC3 in a third operating context. The power supplier 221 receives the context control signal SC3. The power supplier 221 generates the simulated charging power SPW in response to the context control signal SC3. In addition, the electronic load 222 receives the context control signal SC3. The electronic load 222 generates the simulated load SLD in response to the context control signal SC3. Therefore, the device under test DUT may perform a test based on the simulated charging power SPW and the simulated load SLD and provide the test data DT of the third operating context in the third operating context.

In this embodiment, the data capture device 230 may be implemented by the data capture device 130. In this embodiment, the controller 211 is, for example, a central processing unit (CPU), or any other programmable general-purpose or special-purpose microprocessor, digital signal processor (DSP), programmable controller, application specific integrated circuit (ASIC), programmable logic device (PLD), or other similar devices or a combination of these devices, and may load and execute a computer program.

Figure 4:
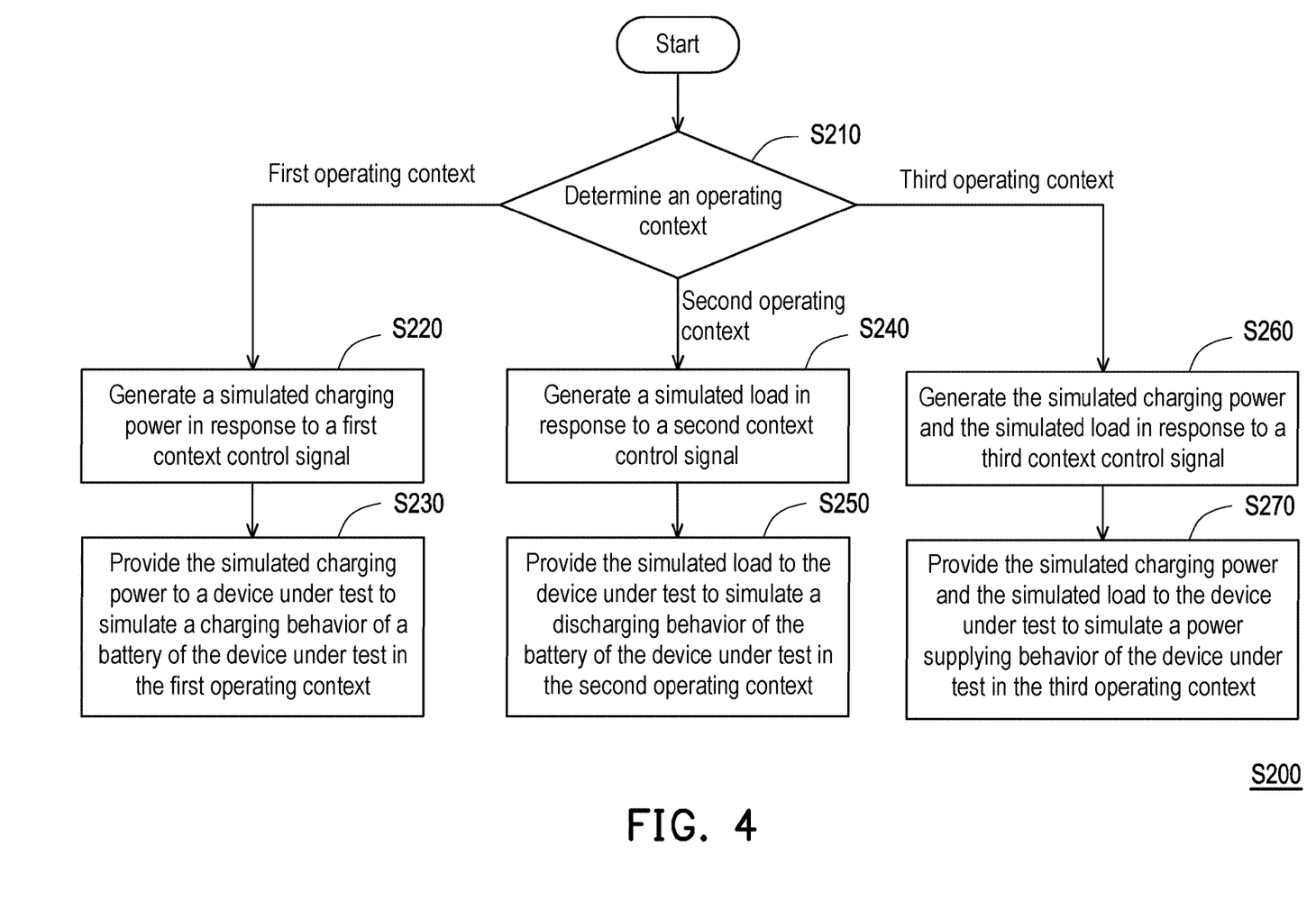
FIG. 4 is a second flowchart of a simulation test method according to an embodiment of the disclosure.

With reference to FIG. 1 and FIG. 4 together, FIG. 4 is a second flowchart of a simulation test method according to an embodiment of the disclosure. In this embodiment, a simulation test method S200 is for testing the device under test DUT. The simulation test method S200 is applicable to the simulation test system 100. The simulation test method S200 includes steps S210 to S270. In step S210, the control device 110 may determine an operating context. For example, the control device 110 may determine the operating context based on an operation on the user interface by a user.

In this embodiment, the control device 110 may generate the context control signal SC1 when the operating context is determined to be a first operating context. In step S220, the power setting device 120 generates the simulated charging power SPW in response to the context control signal SC1 (i.e., a first context control signal). In step S230, the power setting device 120 provides the simulated charging power SPW to the device under test DUT to simulate a charging behavior of a battery (not shown) of the device under test DUT in the first operating context.

In this embodiment, a charging power value of the simulated charging power SPW is less than a charging power value of the battery of the device under test DUT in the first operating context. In other words, the simulation test system 100 performs a charging simulation test on the battery of the device under test DUT in the case where the charging power value of the simulated charging power SPW is insufficient in the first operating context. In this embodiment, the charging power value of the simulated charging power SPW is equal to a product of a set power value, a power conversion efficiency, and a charging efficiency in the first operating context.

For example, the charging power value of the battery of the device under test DUT is 57 watts. The control device 110 is operated to provide the set power value, the power conversion efficiency, and the charging efficiency. The design capacity of the battery of the device under test DUT is 57 watt-hours. The power conversion efficiency is a simulated power conversion efficiency of a power supply circuit or an adapter, for example. The power conversion efficiency is set to 0.95 (i.e., 95%). The charging efficiency is a simulated efficiency of a charging circuit of the device under test DUT, for example. The charging efficiency is set to 0.91 (i.e., 91%). The set power value is set to 45 watts. Therefore, the charging power value of the simulated charging power SPW is approximately equal to 38.90 watts (45×0.95×0.91). Therefore, the device under test DUT may perform a charging simulation test based on a charging rate (C-rate) of approximately 0.68 C and provide the test data DT in the first operating context. The control device 110 may analyze the test data DT. Following the above embodiment, the control device 110 may obtain a charging time of the battery of the device under test DUT and an electrical trend during the charging process based on a C-rate of approximately 0.68 C in the case where the charging power value of the simulated charging power SPW is insufficient.

In this embodiment, the control device 110 may generate the context control signal SC2 when the operating context is determined to be a second operating context. In step S240, the power setting device 120 generates the simulated load SLD in response to the context control signal SC2 (i.e., a second context control signal). In step S250, the power setting device 120 provides the simulated load SLD to the device under test DUT to simulate a discharging behavior of the battery of the device under test DUT in the second operating context. In this embodiment, the simulated load SLD may be adjusted in response to the context control signal SC2. Therefore, the battery of the device under test DUT may discharge the simulated load SLD to provide the test data DT in the second operating context.

In this embodiment, the control device 110 may generate the context control signal SC3 when the operating context is determined to be a third operating context. In step S260, the power setting device 120 generates the simulated charging power SPW and the simulated load SLD in response to the context control signal SC3 (i.e., a third context control signal). In step S270, the power setting device 120 provides the simulated charging power SPW and the simulated load SLD to the device under test DUT to simulate a power supplying behavior of the device under test DUT in the third operating context. For example, the device under test DUT may provide the test data DT based on a plurality of simulated charging powers SPW and a plurality of simulated loads SLD different to each other in the third operating context. The control device 110 may determine power parameters or adapters applicable to the device under test DUT based on the test data DT.

Figure 5:
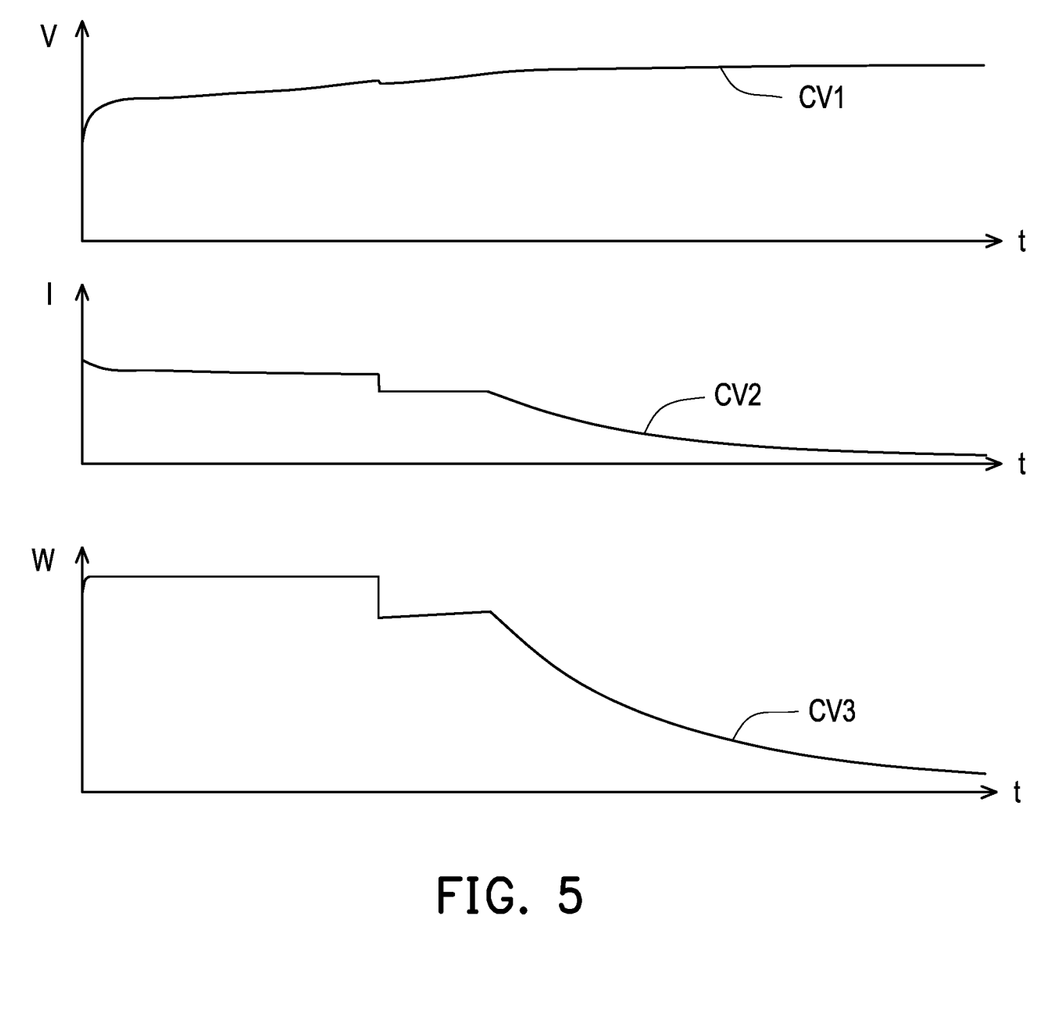
FIG. 5 is a schematic diagram of test data of the first operating context according to an embodiment of the disclosure.

With reference to FIG. 1 and FIG. 5 together, FIG. 5 is a schematic diagram of test data of the first operating context according to an embodiment of the disclosure. In this embodiment, FIG. 5 shows lines CV1 to CV3. The line CV1 is a line of the voltage of the test data DT. The line CV1 represents the change in the voltage value of the battery of the device under test DUT over time. The line CV2 is a line of the current of the test data DT. The line CV2 represents the change in the current value of the battery of the device under test DUT over time. The line CV3 is a line of the power consumption of the test data DT. The line CV3 represents the change in the power consumption over time in the charging behavior of the battery of the device under test DUT.

Figure 6:
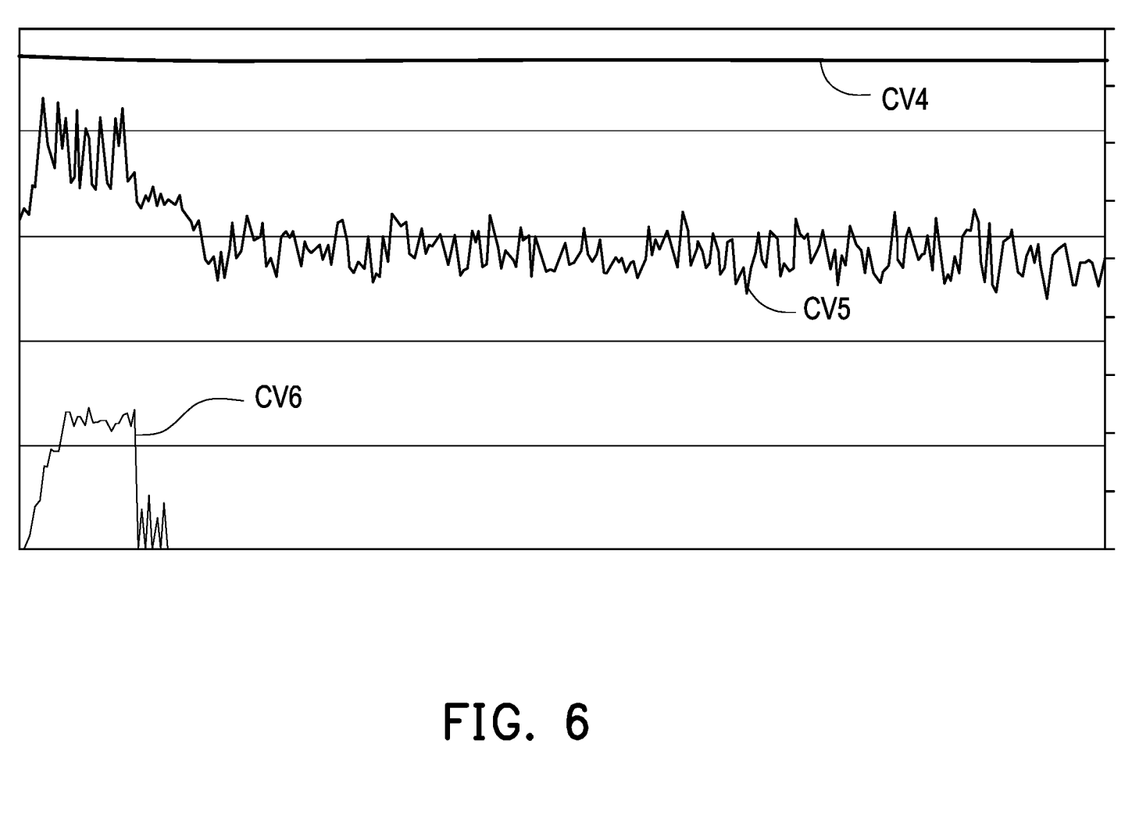
FIG. 6 is a schematic diagram of test data of the third operating context according to an embodiment of the disclosure.

With reference to FIG. 1 and FIG. 6 together, FIG. 6 is a schematic diagram of test data of the third operating context according to an embodiment of the disclosure. In this embodiment, FIG. 5 shows lines CV4 to CV6. The line CV4 is a line of the charge level of the test data DT. The line CV4 represents the change in the charge level of the battery of the device under test DUT over time. The line CV5 is a line of the power consumption of the test data DT. The line CV5 represents the change in the power consumption of the device under test DUT over time. The line CV6 is a line of the C-rate of the test data DT. The line CV6 represents the change in the C-rate over time in the charging behavior of the battery of the device under test DUT.

Figure 7:
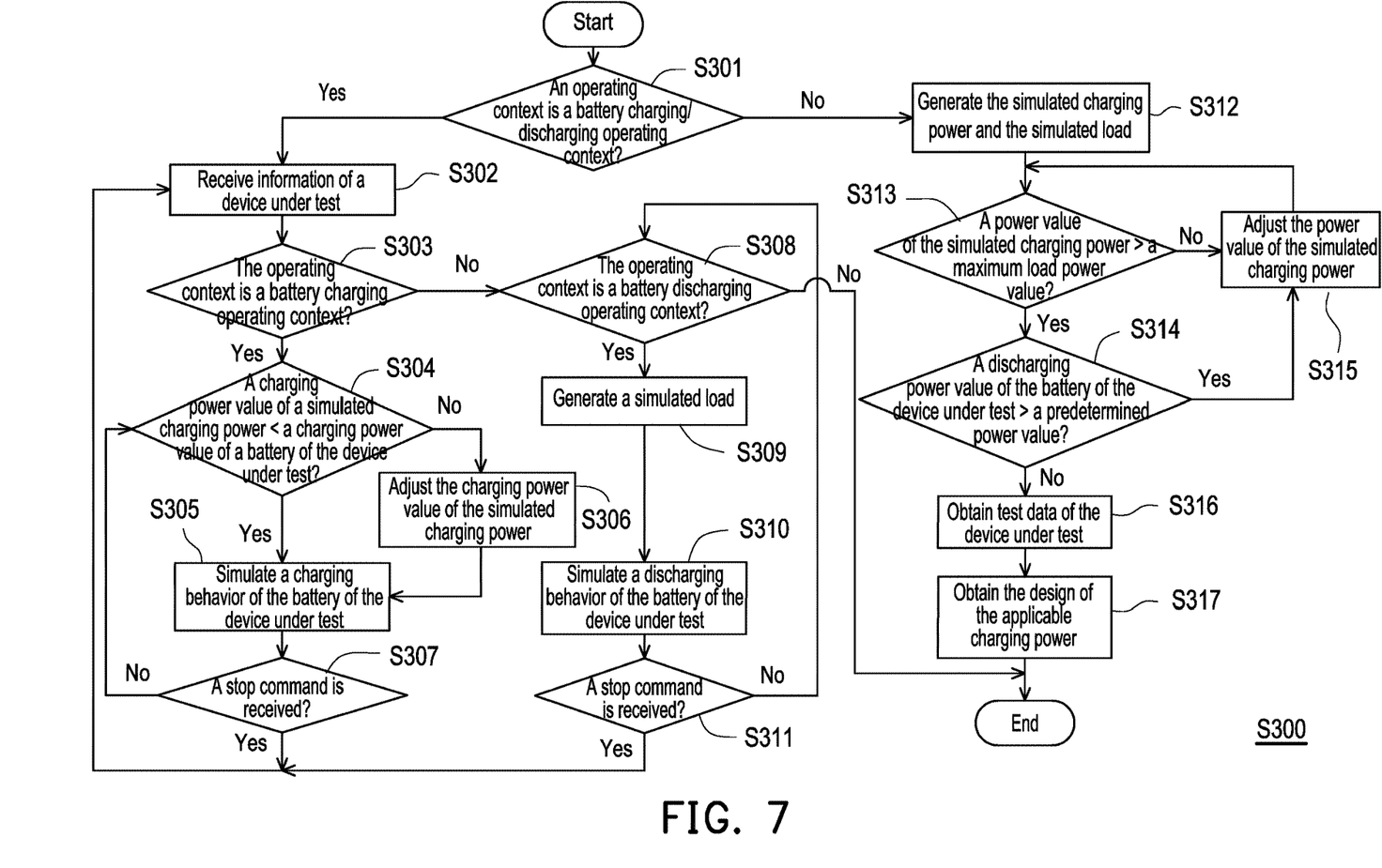
FIG. 7 is a third flowchart of a simulation test method according to an embodiment of the disclosure.

With reference to FIG. 1 and FIG. 7 together, FIG. 7 is a third flowchart of a simulation test method according to an embodiment of the disclosure. In this embodiment, a simulation test method S300 is for testing the device under test DUT. The simulation test method S300 is applicable to the simulation test system 100. The simulation test method S300 includes steps S301 to S317. In step S301, the control device 110 may determine whether an operating context is a battery charging/discharging operating context of the device under test DUT. When the operating context is determined to be the battery charging/discharging operating context of the device under test DUT, in step S302, the control device 110 may receive information of the device under test DUT. For example, in step S302, the control device 110 receives a model and a specification of the battery of the device under test DUT to determine the charging power value of the battery of the device under test DUT.

In step S303, the control device 110 may determine whether the operating context is a battery charging operating context (i.e., a first operating context) of the device under test DUT. When the operating context is determined to be the battery charging operating context of the device under test DUT, in step S304, the control device 110 may determine the charging power value of the simulated charging power SPW. When the charging power value of the simulated charging power SPW is less than the charging power value of the battery of the device under test DUT, in step S305, the power setting device 120 may simulate a charging behavior of the battery of the device under test DUT. In other words, in step S305, the power setting device 120 performs a charging simulation test on the battery of the device under test DUT in the case where the charging power value of the simulated charging power SPW is insufficient.

In step S304, comparatively, when the charging power value of the simulated charging power SPW is greater than or equal to the charging power value of the battery of the device under test DUT, in step S306, the control device 110 may control the power setting device 120 to adjust the charging power value of the simulated charging power SPW and then perform step S305. Further, in step S306, the control device 110 may control the power setting device 120 to reduce the charging power value of the simulated charging power SPW.

In step S307, the control device 110 may determine whether a stop command is received. When the stop command is received, the control device 110 may return to step S302. Comparatively, when the stop command is not received, the control device 110 may return to step S304.

In some embodiments, when the stop command is received, the simulation test method S300 may end. In some embodiments, when the stop command is not received, the control device 110 may return to step S305 or step S303.

Back to step S303, when the operating context is determined not to be the battery charging operating context of the device under test DUT, in step S308, the control device 110 may determine whether the operating context is a battery discharging operating context (i.e., a second operating context) of the device under test DUT. When the operating context is determined to be the battery discharging operating context of the device under test DUT, in step S309, the control device 110 may control the power setting device 120 to generate the simulated load SLD. In step S310, the power setting device 120 simulates a discharging behavior of the battery of the device under test.

In step S311, the control device 110 may determine whether a stop command is received. When the stop command is received, the control device 110 may return to step S302. Comparatively, when the stop command is not received, the control device 110 may return to step S308. In some embodiments, when the stop command is received, the simulation test method S300 may end.

In step S308, when the operating context is determined not to be the battery discharging operating context of the device under test DUT, it is indicated that the control device 110 determines that the current operating context is not the battery discharging operating context, and that the current operating context is not the battery charging operating context. The operating context may have changed. Therefore, the simulation test method S300 may end. In some embodiments, in step S308, when the operating context is determined not to be the battery discharging operating context of the device under test DUT, the control device 110 may return to step S301.

Back to step S301, when the operating context is determined not to be the battery charging/discharging operating context of the device under test DUT, in step S312, the control device 110 may control the power setting device 120 to generate the simulated charging power SPW and the simulated load SLD. Therefore, the power setting device 120 may utilize the simulated charging power SPW and the simulated load SLD to simulate a power supplying behavior (i.e., a third operating context) of the device under test DUT. In step S313, the control device 110 may determine whether a power value of the simulated charging power is greater than a maximum load power value of the device under test DUT. When the power value of the simulated charging power SPW is greater than the maximum load power value of the device under test DUT, the control device 110 may perform step S314.

Comparatively, in step S313, when the power value of the simulated charging power SPW is less than or equal to the maximum load power value of the device under test DUT, it is indicated that the power value of the simulated charging power SPW is insufficient. Then, in step S315, the control device 110 controls the power setting device 120 to adjust the power value of the simulated charging power SPW. In other words, the power setting device 120 increases the power value of the simulated charging power SPW. Afterward, the control device 110 may return to step S313.

In step S314, the control device 110 may further determine a discharging power value of the battery of the device under test DUT. When the discharging power value of the battery of the device under test DUT is greater than a predetermined power value, it is indicated that the discharging power value of the battery of the device under test DUT is obviously discharged. That is, the power value of the simulated charging power SPW is still insufficient, and the battery of the device under test DUT is required to participate in power supplying. Therefore, in step S315, the control device 110 controls the power setting device 120 to adjust the power value of the simulated charging power SPW. In other words, the power setting device 120 increases the power value of the simulated charging power SPW. Comparatively, when the discharging power value of the battery of the device under test DUT is less than or equal to the predetermined power value, in step S316, the control device 110 obtains the test data DT of the device under test DUT through the data capture device 130.

In step S317, the control device 110 may obtain the design of the charging power applicable to the device under test DUT based on the test data DT and the simulated charging power SPW. For example, the control device 110 determines the appropriate charging power of the device under test DUT in response to different loads and determines a specification of the adapter or the power supplier applicable to the device under test DUT. When step S317 is completed, the simulation test method S300 may end.

In this embodiment, the simulation test method S300 may be adjusted depending on the actual requirements. In some embodiments, step S304 may be omitted. In some embodiments, one of steps S313 and S314 may be omitted.

Figure 8:
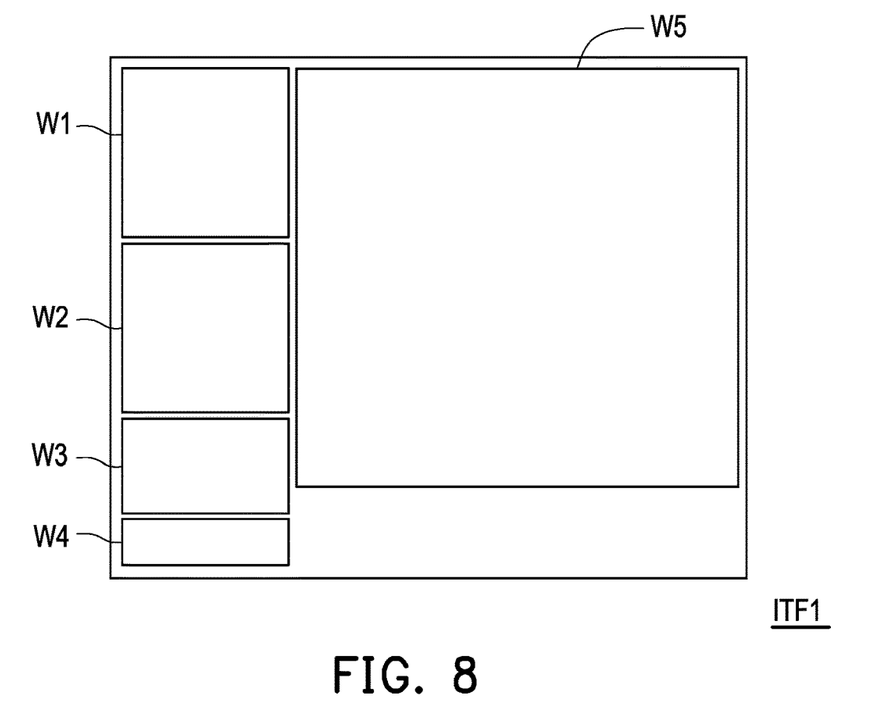
FIG. 8 is a schematic diagram of an operation interface of the first operating context according to an embodiment of the disclosure.

With reference to FIG. 3, FIG. 4, and FIG. 8 together, FIG. 8 is a schematic diagram of an operation interface of the first operating context according to an embodiment of the disclosure. In this embodiment, in step S210, the controller 211 determines that the operating context is the first operating context. Therefore, the controller 211 may control the user interface 213 to provide an operation interface ITF1 of the first operating context. For example, the operation interface ITF1 includes windows W1 to W5. The window W1 displays basic information of the device under test DUT. The basic information includes at least one of a name, a model, a specification, a manufacturer, a manufacturing date, a battery name, and a battery specification of the device under test DUT. In this embodiment, the controller 211 may obtain the basic information of the device under test DUT through the data capture device 230 or in other manners.

The window W2 displays a setting menu for the simulated charging power SPW. The setting menu includes at least one of the set power value, the set voltage value, the set current value, or other setting items of the simulated charging power SPW. In this embodiment, a user may input or select the set power value, the set voltage value, the set current value, or other values of the simulated charging power SPW in the setting menu. The controller 211 may control the context simulator 212 to provide the context control signal SC1 based on the value in the setting menu. Therefore, the power supplier 221 may provide the simulated charging power SPW in response to the context control signal SC1. The power value, the voltage value, and the current value of the simulated charging power SPW are associated with or approximately equal to the value in the setting menu, for example.

The window W3 displays a capture setting menu. The capture setting menu includes at least one of the power value, the voltage value, and the current value of the simulated charging power SPW. The capture period includes capture setting items. A user may input or select the capture period of the data capture device 230 in the capture setting menu. For example, the capture period is set to 1 second. The data capture device 230 may capture the test data DT every 1 second.

The window W4 displays a start/stop icon. A user may operate the start/stop icon to start or stop simulating the charging behavior of the battery the device under test DUT in the first operating context.

The window W5 displays a data log of the test data DT. For example, the window W5 lists information of the test data DT of the first operating context, for example, corresponding to the test values in FIG. 5.

Figure 9:
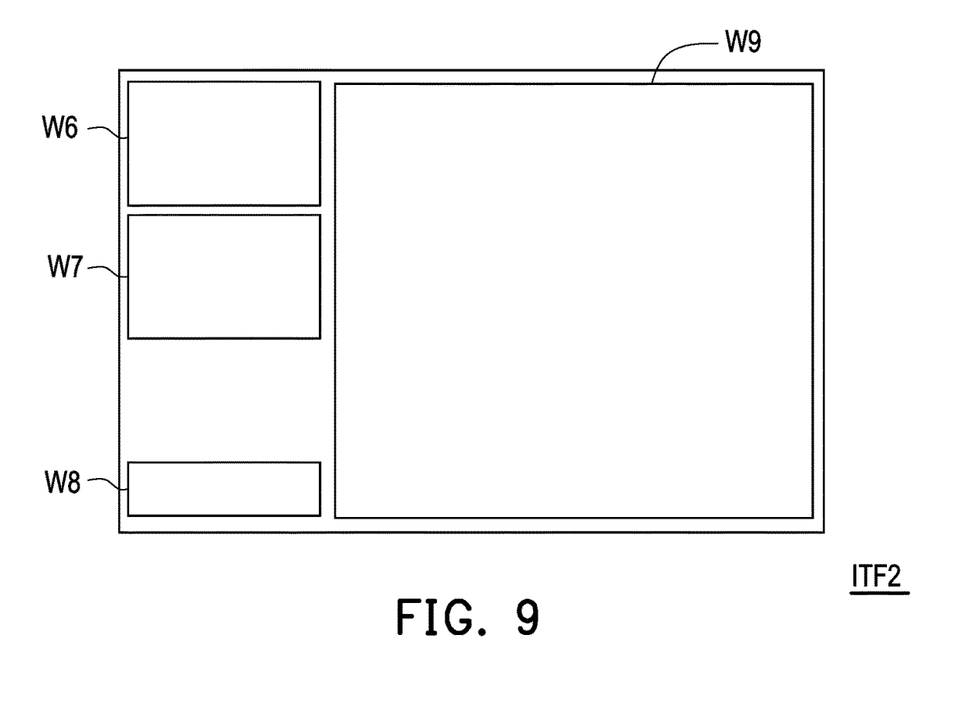
FIG. 9 is a schematic diagram of an operation interface of the third operating context according to an embodiment of the disclosure.

With reference to FIG. 3, FIG. 4, and FIG. 9 together, FIG. 9 is a schematic diagram of an operation interface of the third operating context according to an embodiment of the disclosure. In this embodiment, in step S210, the controller 211 determines that the operating context is the third operating context. Therefore, the controller 211 may control the user interface 213 to provide an operation interface ITF2 of the third operating context. In this embodiment, the operation interface ITF2 includes windows W6 to W9. The window W6 displays a setting menu for the simulated charging power SPW. The setting menu, for example, serves for setting a power mode, such as an alternating current (AC) mode, a direct current (DC) mode, or an alternating current and direct current mode, of the simulated charging power SPW. In some embodiments, the setting menu includes at least one of the set power value, the set voltage value, the set current value, or other setting items of the simulated charging power SPW.

The window W7 displays a setting menu for the simulated load SLD. The setting menu includes at least one of the set power value, the set voltage value, the set current value, or other setting items of the simulated load SLD. In this embodiment, a user may input or select the set power value, the set voltage value, the set current value, or other values of the simulated load SLD in the setting menu. The controller 211 may control the context simulator 212 to provide the context control signal SC3 based on the setting menu for the simulated charging power SPW and the setting menu for the simulated load SLD. Therefore, the power supplier 221 may provide the simulated charging power SPW in response to the context control signal SC3, and the electronic load 222 may provide the simulated load SLD in response to the context control signal SC3.

The window W8 displays a start/stop icon. A user may operate the start/stop icon to start or stop simulating the power supplying behavior of the device under test DUT in the third operating context. The window W9 displays a data log of the test data DT. For example, the window W9 lists information of the test data DT of the third operating context, for example, corresponding to the test values in FIG. 6.

In summary of the foregoing, in the simulation test system and the simulation test method according to the embodiments of the disclosure, at least one of the simulated charging power and the simulated load is generated in response to the context control signal, and at least one of the simulated charging power and the simulated load is provided to the device under test. The device under test simulates the test behavior of the device under test in the corresponding operating context in response to at least one of the simulated charging power and the simulated load. Accordingly, in the simulation test system and the simulation test method, simulation tests of a variety of power contexts may be performed on the device under test.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A simulation test system for testing a variety of power contexts of a device under test, the simulation test system comprising:
   a control device configured to generate a context control signal corresponding to one of a plurality of operating contexts;
   a power setting device coupled to the control device and the device under test, and being configured to generate at least one of a simulated charging power and a simulated load in response to the context control signal and provide at least one of the simulated charging power and the simulated load to the device under test to configure the device under test to generate test data in response to at least one of the simulated charging power and the simulated load, wherein the power setting device comprises:
      a power supplier coupled to the control device and the device under test, and being configured to generate the simulated charging power in response to the context control signal; and an electronic load coupled to the control device and the device under test, and being configured to generate the simulated load in response to the context control signal, wherein the control device determines whether a power value of the simulated charging power is greater than a maximum load power value of the device under test, and the control device controls the power setting device to adjust the power value of the simulated charging power when the power value of the simulated charging power is less than or equal to the maximum load power value of the device under test, wherein the control device further determines a discharging power value of a battery, and the control device controls the power setting device to adjust the power value of the simulated charging power when the discharging power value of the battery is greater than a predetermined power value; and a data capture device coupled to the control device and the device under test, and being configured to capture the test data under the variety of power contexts and provide the test data to the control device.

2. The simulation test system according to claim 1, wherein the control device comprises:
a context simulator coupled to the power setting device; and
a controller coupled to the data capture device and the context simulator, and being configured to receive the test data and control the context simulator to generate the context control signal to configure the power setting device to simulate a test behavior of the device under test in a corresponding operating context,
wherein the test data is associated with a simulation result of the test behavior.

3. The simulation test system according to claim 1, wherein
the control device generates a first context control signal in a first operating context among the plurality of operating contexts,
the power setting device generates the simulated charging power in response to the first context control signal and provides the simulated charging power to the device under test to simulate a charging behavior of the battery of the device under test in the first operating context, and
a charging power value of the simulated charging power is less than a charging power value of the battery in the first operating context.

4. The simulation test system according to claim 3, wherein the charging power value of the simulated charging power is equal to a product of a set power value, a power conversion efficiency, and a charging efficiency in the first operating context.

5. The simulation test system according to claim 4, wherein the control device is operated to provide the set power value, the power conversion efficiency, and the charging efficiency in the first operating context.

6. The simulation test system according to claim 3, wherein
the control device generates a second context control signal in a second operating context among the plurality of operating contexts, and
the power setting device generates the simulated load in response to the second context control signal and provides the simulated load to the device under test to simulate a discharging behavior of the battery in the second operating context.

7. The simulation test system according to claim 6, wherein
the control device generates a third context control signal in a third operating context among the plurality of operating contexts, and
the power setting device generates the simulated charging power and the simulated load in response to the third context control signal and provides the simulated charging power and the simulated load to the device under test to simulate a power supplying behavior of the device under test in the third operating context.

8. The simulation test system according to claim 1, wherein the control device comprises:
a user interface configured to provide corresponding operation interfaces in different operating contexts.

9. A simulation test method for testing a variety of power contexts of a device under test, the simulation test method comprising:
generating, by a control device, a context control signal corresponding to one of a plurality of operating contexts;
generating at least one of a simulated charging power and a simulated load in response to the context control signal and providing at least one of the simulated charging power and the simulated load to the device under test; and
configuring the device under test to simulate a test behavior of the device under test in a corresponding operating context to generate test data under the variety of power contexts in response to at least one of the simulated charging power and the simulated load,
wherein generating the context control signal corresponding to one of the plurality of operating contexts comprises:
generating, by a power supplier, the simulated charging power in response to the context control signal;
generating, by an electronic load, the simulated load in response to the context control signal;
determining, by the control device, whether a power value of the simulated charging power is greater than a maximum load power value of the device under test, and adjusting, by the control device, the power value of the simulated charging power when the power value of the simulated charging power is less than or equal to the maximum load power value of the device under test; and
determining, by the control device, a discharging power value of a battery, and adjusting, by the control device, the power value of the simulated charging power when the discharging power value of the battery is greater than a predetermined power value.

10. The simulation test method according to claim 9, wherein
generating the context control signal corresponding to one of the plurality of operating contexts comprises:
generating a first context control signal in a first operating context among the plurality of operating contexts; and
generating at least one of the simulated charging power and the simulated load in response to the context control signal and providing at least one of the simulated charging power and the simulated load to the device under test comprises:
generating the simulated charging power in response to the first context control signal and providing the simulated charging power to the device under test to simulate a charging behavior of the battery of the device under test in the first operating context, wherein a charging power value of the simulated charging power is less than a charging power value of the battery in the first operating context.

11. The simulation test method according to claim 10, wherein the charging power value of the simulated charging power is equal to a product of a set power value, a power conversion efficiency, and a charging efficiency in the first operating context.

12. The simulation test method according to claim 10, wherein generating the context control signal corresponding to one of the plurality of operating contexts comprises:
  generating a second context control signal in a second operating context among the plurality of operating contexts; and
generating at least one of the simulated charging power and the simulated load in response to the context control signal and providing at least one of the simulated charging power and the simulated load to the device under test comprises:
  generating the simulated load in response to the second context control signal and providing the simulated load to the device under test to simulate a discharging behavior of the battery in the second operating context.

13. The simulation test method according to claim 12, wherein generating the context control signal corresponding to one of the plurality of operating contexts comprises:
  generating a third context control signal in a third operating context among the plurality of operating contexts; and
generating at least one of the simulated charging power and the simulated load in response to the context control signal and providing at least one of the simulated charging power and the simulated load to the device under test comprises:
  generating the simulated charging power and the simulated load in response to the third context control signal and providing the simulated charging power and the simulated load to the device under test to simulate a power supplying behavior of the device under test in the third operating context.

* * * * *